Patented July 8, 1952

2,602,759

UNITED STATES PATENT OFFICE 2,602,759

METHOD OF APPLYING PLASTERLIKE MATERIAL TO STRUCTURES

Eugene Mollo, Farnham, England, assignor to Cheecol Processes Limited, London, England, a British company, and Aerocem Limited, London, England, a British company No Drawing. Application November 26, 1947, Serial No. 788,316. In Great Britain September 19, 1946

Section 1, Public Law 690, August 8, 1946
Patent expires September 19, 1966

9 Claims. (Cl. 117—104)

This invention is for improvements in or relating to a method of applying a rendering of plaster-like material to structures.

It is well known to apply cementitious mixes to the surfaces of structures, such as walls and ceilings, by trowelling or by hand a mixture of sand, cement and water of a suitable consistency. Such methods are slow, require considerable skill and are therefore expensive.

Many efforts have been made to apply such renderings by the aid of spray guns or like spraying devices but such methods have, in general, not proved successful due to the tendency of the constituents of the mixtures to separate.

An object of the present invention is to provide a method of applying such renderings which will be simple, effective and cheap and which will prevent the separation of the constituents of the mixture.

According to the present invention, therefore, there is provided a method of applying a rendering of plaster-like material to the surfaces of structures which comprises forming a plaster mix, adding a wetting, frothing or dispersing agent to the mix in an amount of from 0.001% to 0.5%, preferably about 0.1%, by weight of the settable solid component of said mix, to form a mass of "creamy consistency," introducing air into the mass to effect an increase in volume of at least 20% and discharging the aerated mix on to the surface to be rendered by means of an air pressure operated spray gun or like spraying device.

The expression "creamy consistency" as used herein means a consistency which is sufficiently fluid to allow the mix to flow freely through the pipe-line and nozzle of the spraying apparatus and yet is sufficiently self-supporting to be capable of remaining in position on the surface to which it has been applied.

The preferred increase in volume is from about 45% to 55% and is readily achieved by vigorous agitation of the mix, advantageously in a whisking machine specially designed for the purpose of aerating concrete mixes. Any other convenient method, however, for achieving the incorporation of the air in the mix may be adopted.

The proportion of water in the mix may be varied in accordance with the degree of volume increase which is required, for example, for a smaller volume increase during aeration, the proportion of water may be less than would be required for a greater volume increase on aeration.

The expression "plaster mix" is used herein to indicate the lime plasters, the several calcium sulphate plasters, cements, and mixtures of lime or plaster or both with cements.

According to a feature of the invention, therefore, the plaster mix comprises a mix of sand, cement and water, the ratio of sand to cement being not greater than 3:1. The preferred ratio of sand to cement is from 1:1 to 2:1 but the actual ratio selected will depend upon the particular purpose for which the rendering is required. The ratio of water to cement will vary depending upon the degree of volume increase which is desired. For a volume increase of about 50% the weight ratio of water to cement may be from about 0.55 to about 0.65, preferably about 0.6, the figure being calculated with reference to the final mix, that is, taking into consideration the moisture content of the sand used.

I have found that when operating in accordance with the present invention, the plaster-like material can readily be sprayed through any suitable spraying apparatus operated by air pressure provided, of course, that the orifice of the spray gun is sufficiently large to permit of the passage of the largest of the said particles present in the mix. Spray guns which can be used for the spraying of paint and like liquid compositions can be employed, but preferably the spraying device is one which has uninterrupted passages, preferably straight and preferably being provided with conical pressure ports converging towards the point of discharge.

It will be understood that the wetting, frothing or dispersing agent employed is of such a character that it is not precipitated or destroyed by any alkali, calcium or magnesium compounds present in the mix or liberated by a component thereof. It will be appreciated that so long as the wetting, frothing or dispersing agent remains effective for a period of time sufficient to maintain the ingredients of the mix substantially uniformly dispersed until they have been discharged from the spraying device it will have satisfactorily fulfilled its function.

The preferred class of wetting, frothing and dispersing agents are the sulphated higher alcohols and their alkali metal salts, a particularly suitable wetting agent being the material sold under the trade-mark "Cheecol XX" the word "Cheecol" being a registered trade-mark: "Cheecol" comprises a mixture of the sodium salts of sulphated higher fatty alcohols.

The method of the present invention may, in some circumstances, be so operated as to produce a cellular rendering on the surface of the structure to which it has been applied, such cellular rendering being particularly advantageous where thermal and sound insulation is required.

The following examples illustrate the production of plaster mixes which are suitable for application by means of a spray gun:

Example 1.—A mix was prepared by mixing together approximately 96 lbs. of coarse sand, approximately 36 lbs. of hydrated lime, approximately 4 gallons of water and, when these materials had been mixed together, 25 fluid ounces of the wetting agent sold under the trade name "Cheecol XX" were added to the mix and this was then vigorously agitated in a whisking machine for 4 minutes.

The mix was readily sprayable to form a good even rendering on a wall surface.

Example 2.—A standard plaster mix was prepared by stirring the calcium sulphate sold under the trade name "Syrupite" into 1½ gallons of water, the amount of the plaster being such that the mix had a creamy consistency as referred to above. 2½ fluid ounces of a wetting agent sold under the trade name "Cheecol XX" were then added and the plaster mix vigorously agitated for 2 minutes as in Example 1, this mix was readily sprayable.

Example 3.—A first coat of plaster was prepared by mixing 1½ parts of sand, 1½ parts of the plaster sold under the trade name "Paristone" with sufficient water to form a mix of a creamy consistency, whereafter the wetting agent sold under the trade name "Cheecol XX" was added so that the mix contained about 0.1% by weight of wetting agent calculated upon the weight of plaster. A second plaster mix was prepared in substantially the same way as the foregoing plaster mix but containing 2 parts of sand to 1 of plaster, whilst a third plaster mix was prepared utilising the same plaster as in the two preceding mixes; this plaster was prepared as described in Example 2.

The first mix was used as an initial rendering, the second mix was used as a second rendering and the third mix was used as a final finishing rendering.

Example 4.—A plaster mix was prepared by mixing together 64 lbs. sand, 14 lbs. of hydrated lime, 8 lbs. of Portland cement and 1 gallon of water; to this mix there was added 10 fluid ounces of the wetting agent sold under the trade name "Cheecol XX" and the mix was then given a 4 minutes' whisk as described in Example 1.

This plaster mix is particularly suitable as an internal rendering to receive a top rendering of the plaster described in Example 2.

Example 5.—A mix was prepared by mixing together 96 lbs. sand, 14 lbs. of hydrated lime, 12 lbs. of Snowcrete, 4 ounces of cow hair and 3 gallons of water; 22 fluid ounces of the wetting agent sold under the trade name "Cheecol XX" were then added to the mix which was then given a 4 minutes' whisk as described in Example 1.

Example 6.—A mix was prepared by mixing together approximately 96 lbs. of coarse sand, approximately 36 lbs. of Portland cement and approximately 4 gallons of water, and when these materials had been mixed together, 25 fluid ounces of the wetting agent sold under the trade name "Cheecol XX" were added to the mix and this was then vigorously agitated in a whisking machine for 5 minutes.

The mix was readily sprayable to form a good even rendering on a wall surface.

All the mixes referred to in the foregoing examples are capable of being sprayed to form a satisfactory rendering upon a wall surface or the like and it is to be understood that the invention is not limited to the particular specific details of these examples.

I claim:

1. A method of applying a rendering of plaster which comprises forming a plaster mix, adding a frothing agent to said mix in an amount of from 0.001% to 0.5% by weight of the settable solid component of said mix to form a mass of a consistency and fineness of particles such that it is self-supporting but sufficiently fluid to flow through a pipe-line and through the spray nozzle of a spray gun suitable for spraying paint, introducing air into the mass to aerate it to effect a volume increase of at least 20% and to form a stable, cellular mass and spraying the aerated mix on to the surface to be rendered by means of air pressure.

2. A method according to claim 1 wherein air is introduced into said mass until a volume increase of from 45% to 55% is achieved.

3. A method according to claim 1 wherein said plaster mix comprises sand, Portland cement and water, the ratio of sand to cement being not greater than 3:1.

4. A method according to claim 3 wherein the ratio of sand to cement is between 1:1 and 2:1 and the ratio of water to cement is between 0.55:1 and 0.65:1.

5. A method according to claim 1 wherein said plaster mix comprises hydrated lime as the settable solid component of the mix.

6. A method according to claim 1 wherein said plaster mix comprises calcium sulphate plaster as the settable solid component of the mix.

7. A method according to claim 1 wherein said frothing agent is an alkali metal salt of a sulphated higher alcohol.

8. A method of applying a rendering of plaster to the surfaces of structures which comprises forming a mix of sand, cement, water and a frothing agent of a consistency and fineness of particles such that it is self-supporting but sufficiently fluid to flow through a pipe-line and through the spray nozzle of a spray gun suitable for spraying paint, the ratio of sand to cement being not greater than 3:1 the weight ratio of total water to cement being from 0.55:1 to 0.65:1 and the amount of said frothing agent being from 0.001% to 0.5% by weight of the cement, introducing air into the mix to effect an increase in volume of from 45% to 55% and to form a stable cellular mix and spraying the aerated mix on to the surface to be rendered by means of air pressure.

9. A method according to claim 8 wherein said frothing agent is an alkali metal salt of a sulphated higher alcohol.

EUGENE MOLLO.

REFERENCES CITED

The following references are of record in the file of this patent:

UNITED STATES PATENTS

| Number | Name | Date |
|--------|------|------|
| 1,983,021 | Eaton | Dec. 4, 1934 |
| 2,382,561 | Gregory | Aug. 14, 1945 |

FOREIGN PATENTS

| Number | Country | Date |
|--------|---------|------|
| 546,335 | Great Britain | July 8, 1942 |